United States Patent
Wu et al.

(10) Patent No.: US 12,207,285 B2
(45) Date of Patent: Jan. 21, 2025

(54) COORDINATED SCHEDULING METHOD AND RELATED APPARATUS

(71) Applicant: HUAWEI TECHNOLOGIES CO., LTD., Guangdong (CN)

(72) Inventors: Guoliang Wu, Xi'an (CN); Wei Dong, Xi'an (CN); Fei Jiao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/580,803

(22) Filed: Jan. 21, 2022

(65) Prior Publication Data
US 2022/0141840 A1    May 5, 2022

Related U.S. Application Data

(63) Continuation of application No. PCT/CN2020/085015, filed on Apr. 16, 2020.

(30) Foreign Application Priority Data

Jul. 24, 2019    (CN) .......................... 201910679626.2

(51) Int. Cl.
*H04W 72/12*    (2023.01)
*H04W 72/08*    (2009.01)
(Continued)

(52) U.S. Cl.
CPC ....... *H04W 72/54* (2023.01); *H04W 72/1215* (2013.01); *H04W 72/535* (2023.01); *H04W 72/541* (2023.01)

(58) Field of Classification Search
CPC . H04W 72/54; H04W 72/541; H04W 72/535; H04W 72/56; H04W 72/542; H04W 72/543; H04W 72/1215
See application file for complete search history.

(56) References Cited

U.S. PATENT DOCUMENTS 6,081,713 A     6/2000  Desgagné
2015/0365831 A1* 12/2015  Ko ......................... H04L 5/001
                                                    370/329
(Continued)

FOREIGN PATENT DOCUMENTS

CN       1541023 A     10/2004
CN     102957450 A      3/2013
(Continued)

OTHER PUBLICATIONS

CMCC, AI-based load balancing. 3GPP TSG-RAN WG3 #112e, Online, May 17-28, 2021, R3-212504, 3 pages.
(Continued)

*Primary Examiner* — Phong La

(57) ABSTRACT

A coordinated scheduling method and a related apparatus are disclosed. The embodiments of this application may be applied to multi-frequency ultra-dense networking. The method includes: A base station first determines one or more frequencies corresponding to cells at a capacity layer and one or more frequencies corresponding to cells at a coverage layer. Some cells at the coverage layer are obtained by combining at least two cells having co-channel interference, and cells at the capacity layer are all cells that are not combined. In addition, the base station further obtains network information of the first terminal on at least one carrier set, and optimizes the current network based on the network information.

15 Claims, 7 Drawing Sheets

(51) Int. Cl.
*H04W 72/50* (2023.01)
*H04W 72/54* (2023.01)
*H04W 72/541* (2023.01)

(56) References Cited

U.S. PATENT DOCUMENTS

| | | | |
|---|---|---|---|
| 2016/0066325 A1* | 3/2016 | Kim | H04W 72/1215 |
| | | | 370/329 |
| 2016/0330680 A1* | 11/2016 | Yi | H04W 36/00692 |
| 2017/0078981 A1* | 3/2017 | Tian | H04W 52/244 |
| 2017/0180090 A1 | 6/2017 | Park et al. | |
| 2017/0272219 A1* | 9/2017 | Park | H04B 7/024 |

FOREIGN PATENT DOCUMENTS

| | | | |
|---|---|---|---|
| CN | 103828425 A | 5/2014 | |
| CN | 105578481 A | 5/2016 | |
| CN | 108206726 A | 6/2018 | |
| CN | 108810907 A | 11/2018 | |
| EP | 1471754 A2 | 10/2004 | |
| EP | 2071736 A1 | 6/2009 | |
| EP | 3016446 A1 | 5/2016 | |
| EP | 3211952 B1 | 11/2018 | |
| JP | 2012199898 A | 10/2012 | |
| WO | 2012045328 A1 | 4/2012 | |
| WO | 2015176317 A1 | 11/2015 | |

OTHER PUBLICATIONS

Jari Salo et al., Inter-layer Mobility Optimization. LTE Small Cell Optimization: 3GPP Evolution to Release 13, Edited by Harri Holma, Antti Toskala and Jussi Reunanen. Chapter 15, 2016, 46 pages.
Extended European Search Report issued in EP20844239.2, dated Jul. 27, 2022, 12 pages.
Alcatel-Lucent, E-MBMS inter-resource block combining. 3GPP TSG RAN WG1 #47bis, Jan. 15-19, 2007, Sorrento, Italy, R1-070444, 6 pages.
Office Action issued in CN201910679626.2, dated May 26, 2021, 5 pages.
Notice of Allowance issued in CN201910679626.2, dated Jan. 10, 2022, 4 pages.
International Search Report and Written Opinion issued in PCT/CN2020/085015, dated Jul. 15, 2020, 8 pages.

* cited by examiner

COORDINATED SCHEDULING METHOD AND RELATED APPARATUS

CROSS-REFERENCE TO RELATED APPLICATIONS

This application is a continuation of International Application No. PCT/CN2020/085015, filed on Apr. 16, 2020, which claims priority to Chinese Patent Application No. 201910679626.2, filed on Jul. 24, 2019. The disclosures of the aforementioned applications are hereby incorporated by reference in their entireties.

TECHNICAL FIELD

This application relates to the field of communication technologies, and in particular, to a method and a related apparatus for coordinated scheduling.

BACKGROUND

With rapid development of mobile internets, services, such as video telephony, streaming media, and mobile payment, have increasing requirements on the mobile networks. In a network, co-channel interference is unavoidable. The co-channel interference deteriorates signal quality of a user in an overlapping area. A smaller distance between base stations results in more severe co-channel interference and worse signal quality. Especially in multi-frequency ultra-dense networking, a distance between base stations is small for each frequency. As a result, for each frequency, co-channel interference is severe and signal quality of a user in an overlapping area of cells is poor.

To resolve this problem, a current method is to combine two cells having co-channel interference on each frequency.

However, the foregoing method resolves problems of the severe co-channel interference and the poor signal quality of the user in the overlapping area of the cells, and also results in other problems: Before the two cells are combined, two terminals that can use a same frequency resource at a same moment in the two cells cannot use a same frequency resource at a same moment after the cells are combined, that is, frequency resource usage is limited. Consequently, an average transmission rate of a terminal in the multi-frequency ultra-dense networking is reduced, especially when the multi-frequency ultra-dense networking is heavily loaded.

SUMMARY

Embodiments of this application provide a coordinated scheduling method and a related apparatus, to reduce co-channel interference and ensure an average transmission rate of a terminal in multi-frequency ultra-dense networking.

A first aspect of the embodiments of this application provides a coordinated scheduling method.

In multi-frequency ultra-dense networking, provided that a capacity layer and a coverage layer are obtained through division based on frequency, a base station determines one or more frequencies corresponding to cells at the capacity layer and one or more frequencies corresponding to cells at the coverage layer.

The coverage layer includes a cell obtained by combining at least two cells having co-channel interference, to reduce co-channel interference of a current network. All the cells at the capacity layer are cells that are not combined, to ensure an overall capacity of a current network.

The base station further obtains network information of a first terminal on at least one carrier set, where the carrier set includes at least one carrier, and each carrier set corresponds to one cell.

The base station optimizes the current network based on the network information.

The division into the coverage layer and the capacity layer reduces the co-channel interference and ensures the overall capacity of the current network, so that an average transmission rate of a terminal in the multi-frequency ultra-dense networking is increased. In addition, the current network is optimized based on the network information, to further increase the average transmission rate of the terminal in the multi-frequency ultra-dense networking.

Based on the first aspect, the embodiments of this application further provide a first implementation of the first aspect, that the base station optimizes the current network based on the network information includes:

the base station determines a target carrier set of the first terminal based on the network information; and the base station schedules the first terminal to the target carrier set, so that the first terminal is located in a target cell corresponding to the target carrier set, where the target cell is a cell at the capacity layer or a cell at the coverage layer.

The base station optimizes the current network through carrier scheduling, and may schedule the first terminal to the target carrier set with better signal quality and a better transmission rate. In addition, the carrier scheduling enables the first terminal to be located in the target cell, to balance load between cells.

Based on the first implementation of the first aspect, the embodiments of this application further provide a second implementation of the first aspect, when the first terminal is located in an overlapping area having co-channel interference of two cells at the capacity layer, if the cell corresponding to the target carrier set is located at the coverage layer, that the base station schedules the first terminal to the target carrier set, so that the first terminal is located in a target cell corresponding to the target carrier set includes:

the base station schedules the first terminal from the overlapping area having co-channel interference at the capacity layer to the target cell corresponding to the target carrier set at the coverage layer, to implement cross-layer handover of the first terminal. This balances load between the coverage layer and the capacity layer, and makes full use of frequency resources of the capacity layer and the coverage layer, so that an average transmission rate of a terminal in the current network is increased.

Based on the first implementation of the first aspect, the embodiments of this application further provide a third implementation of the first aspect, when the first terminal is located in a cell at the coverage layer, if the cell corresponding to the target carrier set is located at the capacity layer, that the base station schedules the first terminal to the target carrier set, so that the first terminal is located in a target cell corresponding to the target carrier set includes:

the base station schedules the first terminal from the cell at the coverage layer to the target cell corresponding to the target carrier set at the capacity layer, to also implement cross-layer handover of the first terminal. This balances load between the coverage layer and the capacity layer, and makes full use of frequency resources of the capacity layer and the coverage layer, so that an average transmission rate of a terminal in the current network is increased.

Based on the first implementation of the first aspect, the embodiments of this application further provide a fourth implementation of the first aspect, when the first terminal is located in an overlapping area having co-channel interference of two cells at the capacity layer, if the cell corresponding to the target carrier set is located at the capacity layer, that the base station schedules the first terminal to the target carrier set, so that the first terminal is located in a target cell corresponding to the target carrier set includes:

the base station schedules the first terminal from the capacity layer to the target cell corresponding to the target carrier set at the capacity layer, so that the first terminal is handed over between different cells at the capacity layer.

Based on the first implementation of the first aspect, the embodiments of this application further provide a fifth implementation of the first aspect, when the first terminal is located in a cell at the coverage layer, if the cell corresponding to the target carrier set is located at the coverage layer, that the base station schedules the first terminal to the target carrier set, so that the first terminal is located in a target cell corresponding to the target carrier set includes:

the base station schedules the first terminal from the cell at the coverage layer to the target cell corresponding to the target carrier set at the coverage layer, so that the first terminal is handed over between different cells at the coverage layer.

Based on the second implementation of the first aspect, the third implementation of the first aspect, the fourth implementation of the first aspect, or the fifth implementation of the first aspect, the embodiments of this application further provide a sixth implementation of the first aspect, that the base station determines a target carrier set of the first terminal based on the network information includes:

the base station determines a transmission rate set of the first terminal based on the network information, where the transmission rate set includes a transmission rate of the first terminal on each carrier set; and the base station determines the target carrier set of the first terminal based on the transmission rate set.

The base station determines the target carrier set based on the transmission rate, so that a transmission rate of the scheduled first terminal can be ensured.

Based on the sixth implementation of the first aspect, the embodiments of this application further provide a seventh implementation of the first aspect, when the first terminal is an accessed terminal, that the base station determines the target carrier set of the first terminal based on the transmission rate set includes:

when at least one transmission rate in the transmission rate set is greater than a current transmission rate of the first terminal, the base station determines a carrier set corresponding to a largest transmission rate in the transmission rate set as the target carrier set of the first terminal; and when no transmission rate in the transmission rate set is greater than the current transmission rate of the first terminal, the base station determines a carrier set corresponding to the current transmission rate as the target carrier set of the first terminal.

The base station compares a transmission rate in the transmission rate set with the current transmission rate; when a transmission rate in the carrier set is greater than the current transmission rate, schedules the first terminal to a carrier set corresponding to the larger transmission rate; and when no transmission rate in the carrier set is greater than the current transmission rate, maintains the first terminal on a carrier set corresponding to the current transmission rate, helping ensure the transmission rate of the first terminal.

Based on the seventh implementation of the first aspect, the embodiments of this application further provide an eighth implementation of the first aspect, when the first terminal is a to-be-accessed terminal, that the base station determines the target carrier set of the first terminal based on the transmission rate set includes:

the base station determines a carrier set corresponding to a largest transmission rate in the transmission rate set as the target carrier set of the first terminal, to ensure that a transmission rate can reach a largest value after the first terminal is accessed.

Based on the second implementation of the first aspect, the third implementation of the first aspect, the fourth implementation of the first aspect, the fifth implementation of the first aspect, the sixth implementation of the first aspect, the seventh implementation of the first aspect, or an eighth implementation of the first aspect, the embodiments of this application further provides a ninth implementation of the first aspect, when there are at least two first terminals, that the base station schedules the first terminal to the target carrier set includes:

the base station schedules one of the at least two first terminals to the target carrier set, where a ratio of a transmission rate of the scheduled first terminal to the current transmission rate is the largest among all of the at least two first terminals, to obtain a maximum gain of one-time scheduling.

Based on the second implementation of the first aspect, the third implementation of the first aspect, the fourth implementation of the first aspect, the fifth implementation of the first aspect, the sixth implementation of the first aspect, the seventh implementation of the first aspect, or an eighth implementation of the first aspect, the embodiments of this application further provides a tenth implementation of the first aspect, when there are at least two first terminals, that the base station schedules the first terminal to the target carrier set includes:

the base station preferentially schedules a first terminal with a largest transmission rate on the target carrier set, to ensure that more first terminals have relatively large transmission rates.

A second aspect of the embodiments of this application provides a coordinated scheduling apparatus, including:

a determining unit, configured to determine one or more frequencies corresponding to cells at a capacity layer and one or more frequencies corresponding to cells at a coverage layer;

an obtaining unit, configured to obtain network information of a first terminal on at least one carrier set, where the carrier set includes at least one carrier, and each carrier set corresponds to one cell; and a processing unit, configured to optimize a current network based on the network information, where the coverage layer includes a cell obtained by combining at least two cells having co-channel interference, and all the cells at the capacity layer are cells that are not combined.

Based on the second aspect, the embodiments of this application further provide a first implementation of the second aspect, the processing unit is configured to:

determine a target carrier set of the first terminal based on the network information; and schedule the first terminal to the target carrier set, so that the first terminal is located in a target cell corresponding to the target carrier set, where the target cell is a cell at the capacity layer or a cell at the coverage layer.

Based on the first implementation of the second aspect, the embodiments of this application further provide a second implementation of the second aspect, when the first terminal is located in an overlapping area having co-channel interference of two cells at the capacity layer, if the cell corresponding to the target carrier set is located at the coverage layer, the processing unit is configured to:
  determine the target carrier set of the first terminal based on the network information; and
  schedule the first terminal from the overlapping area having co-channel interference at the capacity layer to the target cell corresponding to the target carrier set at the coverage layer.

Based on the first implementation of the second aspect, the embodiments of this application further provide a third implementation of the second aspect, when the first terminal is located in a cell at the coverage layer, if the cell corresponding to the target carrier set is located at the capacity layer, the processing unit is configured to:
  determine the target carrier set of the first terminal based on the network information; and
  schedule the first terminal from the cell at the coverage layer to the target cell corresponding to the target carrier set at the capacity layer.

Based on the first implementation of the second aspect, the embodiments of this application further provide a fourth implementation of the second aspect, when the first terminal is located in an overlapping area having co-channel interference of two cells at the capacity layer, if the cell corresponding to the target carrier set is located at the capacity layer, the processing unit is configured to:
  determine the target carrier set of the first terminal based on the network information; and
  schedule the first terminal from the capacity layer to the target cell corresponding to the target carrier set at the capacity layer, so that the first terminal is handed over between different cells at the capacity layer.

Based on the first implementation of the second aspect, the embodiments of this application further provide a fifth implementation of the second aspect, when the first terminal is located in a cell at the coverage layer, if the cell corresponding to the target carrier set is located at the coverage layer, the processing unit is configured to:
  determine the target carrier set of the first terminal based on the network information; and
  schedule the first terminal from the cell at the coverage layer to the target cell corresponding to the target carrier set at the coverage layer, so that the first terminal is handed over between different cells at the coverage layer.

Based on the second implementation of the second aspect, the third implementation of the second aspect, the fourth implementation of the second aspect, or the fifth implementation of the second aspect, the embodiments of this application further provide a sixth implementation of the second aspect, the processing unit is configured to:
  determine a transmission rate set of the first terminal based on the network information, where the transmission rate set includes a transmission rate of the first terminal on each carrier set; and
  determine the target carrier set of the first terminal based on the transmission rate set.

Based on the sixth implementation of the second aspect, the embodiments of this application further provide a seventh implementation of the second aspect, when the first terminal is an accessed terminal,
  that the base station determines the target carrier set of the first terminal based on the transmission rate set includes:
  when at least one transmission rate in the transmission rate set is greater than a current transmission rate of the first terminal, the base station determines a carrier set corresponding to a largest transmission rate in the transmission rate set as the target carrier set of the first terminal; and
  when no transmission rate in the transmission rate set is greater than the current transmission rate of the first terminal, the base station determines a carrier set corresponding to the current transmission rate as the target carrier set of the first terminal.

Based on the sixth implementation of the second aspect, the embodiments of this application further provide an eighth implementation of the second aspect, when the first terminal is a to-be-accessed terminal,
  that the base station determines the target carrier set of the first terminal based on the transmission rate set includes:
  the base station determines a carrier set corresponding to a largest transmission rate in the transmission rate set as the target carrier set of the first terminal.

Based on the second implementation of the second aspect, the third implementation of the second aspect, the fourth implementation of the second aspect, the fifth implementation of the second aspect, the sixth implementation of the second aspect, the seventh implementation of the second aspect, or an eighth implementation of the second aspect, the embodiments of this application further provides a ninth implementation of the second aspect, when there are at least two first terminals, that the base station schedules the first terminal to the target carrier set includes:
  the base station schedules one of the at least two first terminals to the target carrier set, where a ratio of a transmission rate of the scheduled first terminal to the current transmission rate is the largest among all of the at least two first terminals.

Based on the second implementation of the second aspect, the third implementation of the second aspect, the fourth implementation of the second aspect, the fifth implementation of the second aspect, the sixth implementation of the second aspect, the seventh implementation of the second aspect, or an eighth implementation of the second aspect, the embodiments of this application further provides a tenth implementation of the second aspect, when there are at least two first terminals, that the base station schedules the first terminal to the target carrier set includes:
  the base station preferentially schedules a first terminal with a largest transmission rate on the target carrier set.

A third aspect of the embodiments of this application provides a communication apparatus, including at least one processor and a power supply circuit. The power supply circuit is configured to supply power to the processor, and related program instructions are executed by the at least one processor, to enable the communication apparatus to implement the method according to any one of the implementations of the first aspect of this application.

A fourth aspect of the embodiments of this application provides a computer-readable storage medium, including instructions. When the instructions are run on a computer, the computer is enabled to perform the method according to any one of the implementations of the first aspect of this application.

A fifth aspect of the embodiments of this application provides a computer program product. The computer program product includes computer software instructions. The computer software instructions may be loaded by using a processor to implement a procedure of the coordinated scheduling method according to any one of the implementations of the first aspect.

It can be learned from the foregoing technical solutions that the embodiments of this application have the following advantages:

The one or more frequencies corresponding to the cells at the capacity layer and the one or more frequencies corresponding to the cells at the coverage layer are determined. Then, the network information of the first terminal on the at least one carrier set is obtained. Finally, the current network is optimized based on the network information. At the coverage layer, the two cells having co-channel interference are combined, so that co-channel interference of the first terminal at the coverage layer is weak, signal quality is high, and a transmission rate is not excessively low due to the co-channel interference. At the capacity layer, there is no cell obtained through cell combination. Therefore, when the first terminal is located in a cell at the capacity layer, the transmission rate is not reduced due to limited frequency resources. Therefore, cooperation of the coverage layer and the capacity layer can reduce co-channel interference of the current network and ensure an overall capacity of the current network, to ensure the average transmission rate of the terminal in the current network. In addition, optimizing the current network based on the network information may further increase the average transmission rate of the terminal in the current network.

DESCRIPTION OF EMBODIMENTS

Embodiments of this application provide a coordinated scheduling method, to reduce co-channel interference and ensure an average transmission rate of a terminal in multi-frequency ultra-dense networking.

The embodiments of this application may be applied to various communication systems, including but not limited to, a global system for mobile communications (GSM), a code division multiple access (CDMA) system, a wideband code division multiple access (WCDMA) system, a general packet radio service (GPRS) system, a long term evolution (LTE) system, a frequency division duplex long term evolution (LTE-FDD) system, a time division duplex long term evolution (LTE-TDD) system, a universal mobile telecommunications system (UMTS), another wireless communication system using an orthogonal frequency division multiplexing (OFDM) technology, a developing 5th generation (5G) new radio (NR) communication system, and any usable communication system in the future.

In the specification, claims, and the accompanying drawings of this application, the terms "first", "second", and the like are intended to distinguish between similar objects but do not necessarily indicate a specific order or sequence. It should be understood that data termed in such a way is interchangeable in proper circumstances, so that the embodiments described herein can be implemented in other orders than the order illustrated or described herein. In addition, the terms "include", "have" and any other variants mean to cover the non-exclusive inclusion. For example, a process, method, system, product, or device that includes a list of steps or units is not necessarily limited to those units, but may include other units not expressly listed or inherent to such a process, method, product, or device.

Figure 1:
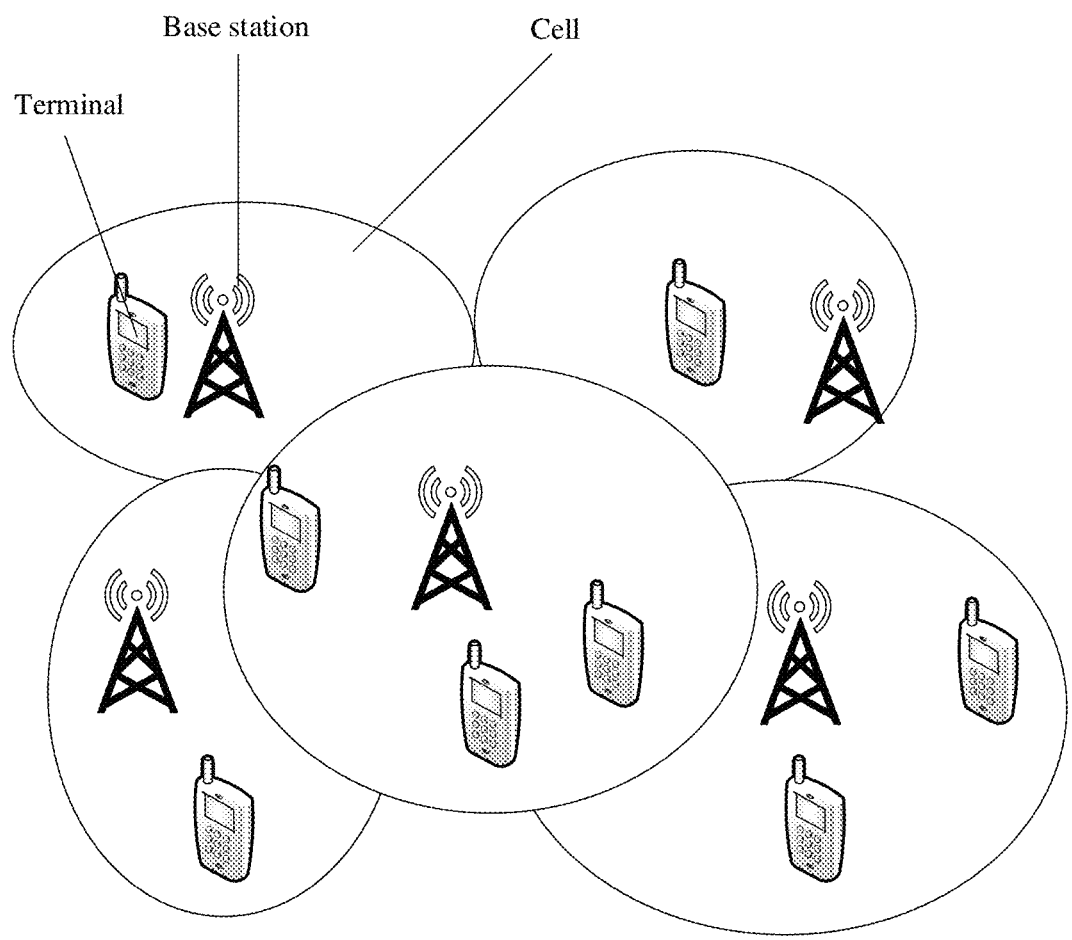
FIG. 1 is a schematic diagram of an example network architecture of multi-frequency ultra-dense networking.

The embodiments of this application may be applied to an example network architecture of multi-frequency ultra-dense networking shown in FIG. 1. The network architecture includes a plurality of frequencies. A frequency is a serial number of a center frequency of a used frequency band. To implement frequency resource reuse, there are a plurality of cells on each frequency. That is, the plurality of cells use the same frequency at the same time.

FIG. 1 shows five cells in the multi-frequency ultra-dense networking. The five cells may share one frequency, may use two frequencies, or may use three frequencies. Herein, two frequencies are used as an example. It is assumed that the five cells share the two frequencies, three of the five cells may use one frequency, and the other two cells may use the other frequency.

In the network architecture of the multi-frequency ultra-dense networking shown in FIG. 1, one base station corresponds to one cell. It should be understood that, in the multi-frequency ultra-dense networking, one base station may have a plurality of cells, and one or more frequencies of all the cells of the base station may be the same or different.

In the embodiments of this application, the base station may be a macro base station, a micro base station, a pico base station, a small cell, a relay station, or the like. A plurality of base stations may support a network of one or more of the foregoing technologies, or a future evolved network. The base station may include one or more co-site or non-co-site transmission reception points (TRPs).

It can be learned from FIG. 1 that, in the network architecture, cells are densely distributed, and a distance between base stations is small. Therefore, for each frequency in the multi-frequency ultra-dense networking, there are usually two cells having co-channel interference. Co-channel interference occurs in an overlapping area of two neighboring cells. A terminal in the overlapping area receives an unwanted signal and a wanted signal that have a same carrier. The unwanted signal causes interference to a receiver receiving the wanted signal of the same frequency.

The terminal in the embodiments of this application may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or the like.

Figure 2:
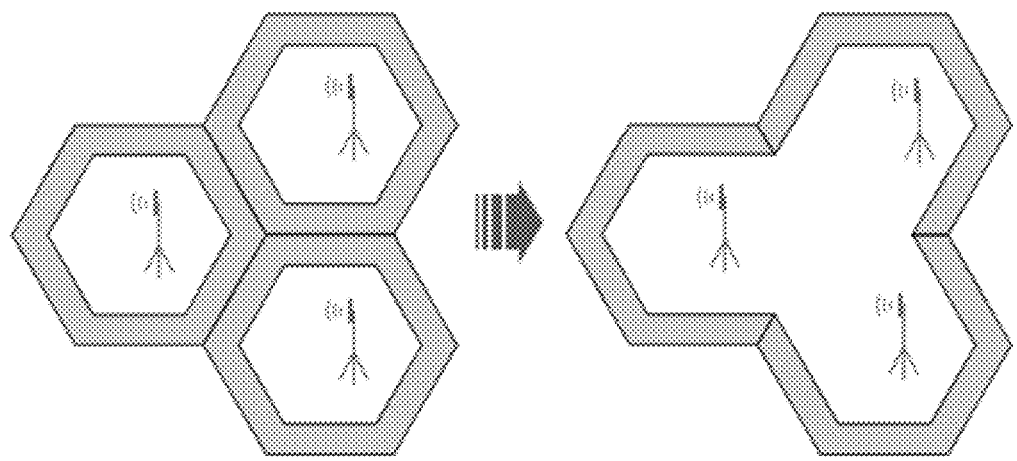
FIG. 2 is an example schematic diagram of cell combination.

It should be understood that the cells having co-channel interference are combined to resolve the co-channel interference. For better understanding of the cell combination, FIG. 2 is a schematic diagram of an example of the cell combination. It can be learned from FIG. 2 that three original independent cells become one cell after the cell combination.

However, if two cells having co-channel interference on each frequency are combined, frequency resource reuse in the multi-frequency ultra-dense networking is greatly reduced, and frequency resource usage is limited. Consequently, an average transmission rate of a terminal in the multi-frequency ultra-dense networking is reduced.

To resolve this problem, the multi-frequency ultra-dense networking is layered in the embodiments of this application. Specifically, the multi-frequency ultra-dense networking is divided into a coverage layer and a capacity layer. A specific method for layering the multi-frequency ultra-dense networking is to select one or more frequencies from all frequencies of the multi-frequency ultra-dense networking as the coverage layer, and remaining frequencies are used as the capacity layer. At the coverage layer, two cells whose co-channel interference reaches a specified degree are combined. At the capacity layer, cells having co-channel interference are not combined.

Figure 3:
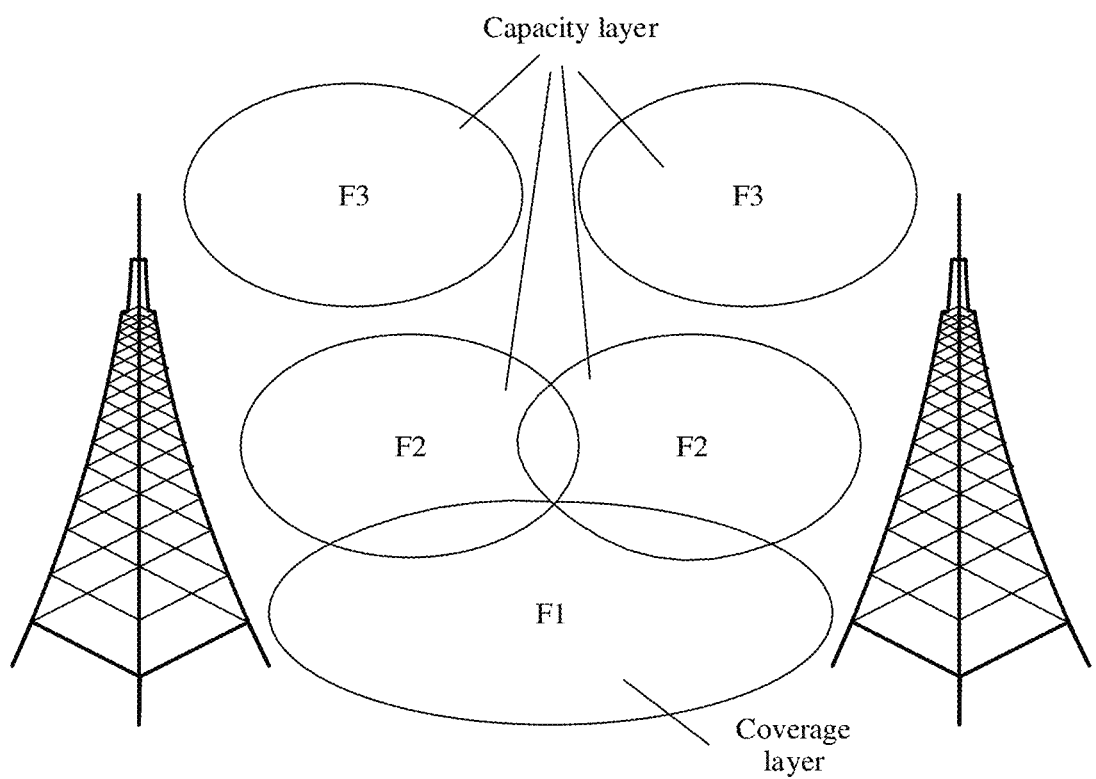
FIG. 3 is a schematic diagram of another example network architecture of multi-frequency ultra-dense networking according to an embodiment of this application.

To better understand layered multi-frequency ultra-dense networking, a specific example is used below for description. FIG. 3 is a schematic diagram of another network architecture of multi-frequency ultra-dense networking according to an embodiment of this application. The network architecture includes three frequencies F1, F2, and F3, and further includes two base stations. Each base station includes three cells, and frequencies of the three cells of each base station are respectively F1, F2, and F3. In this embodiment, the frequency F1 is selected as the coverage layer, and the frequency F2 and F3 are selected as the capacity layer.

At the coverage layer, co-channel interference exists between cells of the two base stations. Therefore, the cells of the two base stations are combined to obtain a cell shown in FIG. 3.

At the capacity layer, there are four cells in total. It can be learned from FIG. 3 that cells of the two base stations on the frequency F2 overlap. That is, co-channel interference exists between the two cells, but the two cells are not combined.

In the foregoing network structure, the coverage layer can meet a requirement of reducing co-channel interference in the multi-frequency ultra-dense networking, and the capacity layer ensures a capacity of the multi-frequency ultra-dense networking, to avoid a reduction of a transmission rate of a terminal due to a resource limitation, so that an average transmission rate of a terminal in the multi-frequency ultra-dense networking can be increased.

Based on the multi-frequency ultra-dense networking shown in FIG. 3, an embodiment of this application provides a coordinated scheduling method, which is described in detail below.

Figure 4:
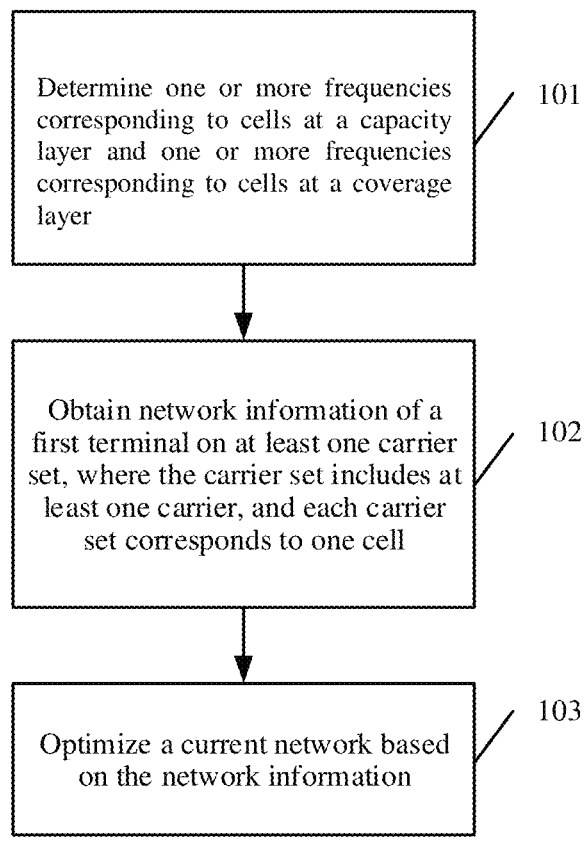
FIG. 4 is a schematic diagram of an embodiment of a coordinated scheduling method according to an embodiment of this application.

FIG. 4 shows an embodiment of a coordinated scheduling method according to an embodiment of this application. The method includes the following operations.

Operation 101: Determine one or more frequencies corresponding to cells at a capacity layer and one or more frequencies corresponding to cells at a coverage layer.

It should be noted that, in a process of layering multi-frequency ultra-dense networking, a base station in the multi-frequency ultra-dense networking is configured. The base station may determine, by using a configuration file, the one or more frequencies corresponding to the cells at the capacity layer and the one or more frequencies corresponding to the cells at the coverage layer. Operation 101 may be performed by one base station or two or more base stations in the multi-frequency ultra-dense networking.

The coverage layer includes a cell obtained by combining at least two cells having co-channel interference, and all the cells at the capacity layer are cells that are not combined.

The coverage layer may be one frequency or a plurality of frequencies. To maximize a coverage area of a cell, a smallest frequency in the multi-frequency ultra-dense networking may be selected as the coverage layer. The cells at the coverage layer are all cells corresponding to the frequency selected as the coverage layer.

At the coverage layer, if co-channel interference between two cells reaches a specified strength, the two cells are combined. A strength of the co-channel interference can be determined in a plurality of manners, for example, may be determined based on cell overlapping.

Specifically, if a difference between downlink levels that are of the two cells and received by the first terminal is less than a threshold, it is considered that the first terminal is located in an overlapping area of the two cells. Then, a quantity of first terminals located in the overlapping area may be counted, and an overlapping degree of the two cells is further determined based on the quantity of first terminals. If the overlapping degree reaches a preset overlapping degree, the two cells are combined.

The capacity layer may be one frequency or a plurality of frequencies. To ensure an overall capacity of the multi-frequency ultra-dense networking, as many frequencies as possible are selected as the capacity layer. For example, if the smallest frequency in the multi-frequency ultra-dense networking is selected as the coverage layer, all other frequencies are used as the capacity layer. The cells at the capacity layer are all cells corresponding to the frequency selected as the capacity layer.

Operation 102: Obtain network information of the first terminal on at least one carrier set, where the carrier set includes at least one carrier, and each carrier set corresponds to one cell.

There may be one first terminal, or two or more first terminals.

The first terminal may be a to-be-accessed terminal. For example, when the first terminal moves to a current network, the base station needs to connect the first terminal to a specific carrier set. Therefore, the base station needs to obtain the network information of the first terminal on the at least one carrier set, to determine the specific carrier set.

The first terminal may alternatively be an accessed terminal. When the first terminal is the accessed terminal, if signal quality of the first terminal is lower than preset signal quality or a transmission rate of the first terminal is smaller than a preset transmission rate, the operation of obtaining network information may be performed. The operation of obtaining network information may be periodic. Duration of the periodicity is not limited in embodiments of this application, for example, may be 10 minutes or one hour.

In this embodiment, each carrier set is related to a type of the first terminal. When the first terminal is a non-carrier aggregation user, the first terminal communicates with the base station by using a single carrier. Therefore, the carrier set includes one carrier. When the first terminal is a carrier aggregation user, the first terminal communicates with the base station by using a carrier group. Therefore, the carrier set includes two or more carriers. For a specific first terminal and configured multi-frequency ultra-dense networking, a total quantity of carrier sets and all types of carrier sets are determined.

One carrier usually corresponds to one cell. Although the carrier group includes two or more carriers, only one carrier in the carrier group is a primary carrier, other carriers are all secondary carriers, and a cell corresponding to the primary carrier is a cell corresponding to the carrier group. Therefore, regardless of a quantity of carriers included in the carrier set, each carrier set corresponds to one cell.

In this embodiment, network information of the first terminal on each carrier set may be obtained in a direct measurement manner. For example, the base station may send instructions to the first terminal, to indicate the first terminal to measure the network information and feed back the measured network information to the base station. Alternatively, the network information of the first terminal on each carrier set may be obtained in a non-measurement manner. For example, the base station obtains the network information by querying historical data, or the base station may obtain related network information from another base station.

The network information may include one type, or may include two or more types. For example, the network information may include reference signal received power, a load of a cell corresponding to a carrier set, bandwidth information corresponding to the carrier set, and the like. A quantity of pieces and a type of network information are not specifically limited in embodiments of this application. To better reflect a status of the first terminal on each carrier set, types of network information may be obtained as many as possible.

It may be understood that a manner of obtaining the network information also depends on the type of network information. For example, when the network information is the reference signal received power, the base station may measure the reference signal received power by using the first terminal. When the network information is the load of the cell corresponding to the carrier set, the base station cannot obtain the load of the cell corresponding to the carrier set through measurement by the first terminal, but can only interact with a base station of the cell corresponding to the carrier set, and obtain the load of the cell corresponding to the carrier set from X2 interface signaling in an interaction process.

Operation 103: Optimize the current network based on the network information.

It should be noted that there are a plurality manners of optimizing the current network based on the network information. For example, when the network information is the load of the cell corresponding to the carrier set, the first terminal may be scheduled to a carrier set corresponding to a cell with smaller load, to optimize the current network. When the network information is the reference signal received power, the first terminal may be scheduled to a carrier set with larger reference signal received power, to optimize the current network.

When the network information includes a plurality of parameters, the current network may be optimized based on the plurality of parameters, to increase an average transmission rate of a terminal in the current network. In conclusion, there are a plurality of methods for optimizing the current network. This is not limited in embodiments of this application.

An example is used below to specifically describe a method for optimizing the current network.

In another embodiment of the coordinated scheduling method provided in the present disclosure, the optimizing of the current network based on the network information includes the following steps.

First, a target carrier set of the first terminal is determined based on the network information.

It should be noted that a method for determining the target carrier set varies with the network information.

For example, when the network information is the load of the cell corresponding to the carrier set, the target carrier set is determined based on the load, and the target carrier set may be a carrier set corresponding to the smallest load.

When the network information is the reference signal received power, the target carrier set is determined based on the reference signal received power, and the target carrier set may be a carrier set corresponding to the largest reference signal received power.

When the network information includes a plurality of types of information, a manner of determining the target carrier set is necessarily different from a manner of determining the target carrier set when the network information is one type of information.

Based on the foregoing descriptions, a specific manner of determining the target carrier set is not limited in embodiments of this application.

Then, the first terminal is scheduled to the target carrier set, so that the first terminal is located in a target cell corresponding to the target carrier set, where the target cell is a cell at the capacity layer or a cell at the coverage layer.

In this embodiment, because the target carrier set corresponds to the target cell, when the first terminal is scheduled to the target carrier set, the first terminal is located in the target cell corresponding to the target carrier set. A specific process is related to both a type of the first terminal and the target carrier set. Details are described below.

When the first terminal is a to-be-accessed user, the first terminal is scheduled to the target carrier set. Regardless of a quantity of carriers included in the target carrier set, the first terminal is connected to the target cell corresponding to the target carrier set.

When the first terminal is an accessed user, in a process of scheduling the first terminal to the target carrier set, cell handover may need to be performed, or the cell handover may not be performed first.

In an embodiment, when the first terminal communicates with the base station by using a single carrier, if the target carrier set is not a current carrier set of the first terminal, in the process of scheduling the first terminal to the target carrier set, the first terminal needs to be handed over from a current cell to the target cell.

When the first terminal communicates with the base station by using a carrier group, there are three cases. Case 1: The target carrier set remains unchanged, and is still the current carrier set of the first terminal. In this case, no scheduling operation needs to be performed, and the first terminal only needs to be maintained in the current cell. Case 2: The target carrier set is different from the current carrier set, but a primary carrier in the target carrier set is the same as a primary carrier in the current carrier set. This means that the target cell is still the current cell. Therefore, only a secondary carrier in the target carrier set needs to be changed, and no cell handover is required. Case 3: The target carrier set is different from the current carrier set, and the primary carrier in the target carrier set is also the same as the primary carrier in the current carrier set. This means that the target cell is not the current cell. Therefore, in the process of scheduling the first terminal to the target carrier set, the first terminal needs to be handed over from the current cell to the target cell.

It should be noted that both carrier scheduling and cell handover are mature technologies, and certain specific processes of the carrier scheduling and cell handover are not described in detail in the present disclosure.

It may be understood that, regardless of whether the first terminal is the to-be-accessed terminal or the accessed terminal, the target cell may be a cell at the coverage layer or a cell at the capacity layer.

In this embodiment, cooperation of the coverage layer and the capacity layer can reduce co-channel interference of the current network and ensure an overall capacity of the current network, so that the average transmission rate of the terminal in the current network can be ensured. In addition, the current network is optimized based on the network information, to further increase the average transmission rate of the terminal in the current network.

It should be noted that when the first terminal is a terminal that has accessed the current network, the current cell of the first terminal may be located at the coverage layer, or may be located at the capacity layer. Similarly, the target cell may be located at the coverage layer, or may be located at the capacity layer.

Therefore, there are a plurality of cases in which the first terminal is scheduled to the target carrier set, so that the first terminal is located in the target cell corresponding to the target carrier set. A scheduling process is specifically described below based on a difference between the current cell and the target cell of the first terminal.

In another embodiment of the coordinated scheduling method provided in the present disclosure, when the first terminal is located in an overlapping area having co-channel interference of two cells at the capacity layer, if the cell corresponding to the target carrier set is located at the coverage layer, that the first terminal is scheduled to the target carrier set, so that the first terminal is located in a target cell corresponding to the target carrier set includes:

the first terminal is scheduled from the overlapping area having co-channel interference at the capacity layer to the target cell corresponding to the target carrier set at the coverage layer.

In this embodiment, the current cell of the first terminal is located at the capacity layer, and the first terminal is located in the overlapping area having co-channel interference. If the capacity layer is overloaded or the co-channel interference is severe, the transmission rate and signal quality of the first terminal are reduced.

In this case, it is assumed that the load of the coverage layer is small and frequency resources are relatively abundant, and the target cell corresponding to the target carrier set may be located at the coverage layer. If the target cell is a cell at the coverage layer, the base station finally hands over the first terminal from the capacity layer to the target cell at the coverage layer.

Figure 5:
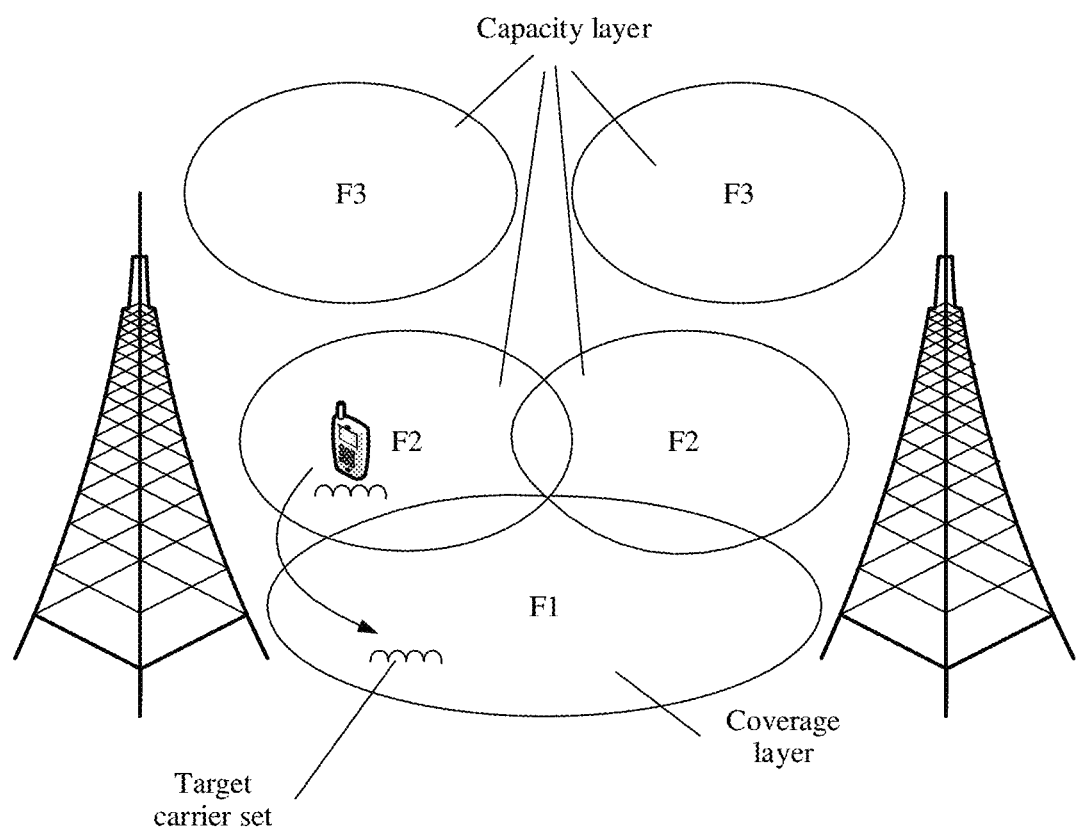
FIG. 5 is a schematic diagram of an embodiment of scheduling on a target carrier set according to an embodiment of this application.

FIG. 5 is a schematic diagram of an embodiment of scheduling on the target carrier set according to an embodiment of this application.

It can be learned from FIG. 5 that the current cell of the first terminal is a cell on a frequency F2, and the cell corresponding to the target carrier set is located on a frequency F1. According to the coordinated scheduling method provided in this embodiment, the first terminal is scheduled to the target carrier set, and the first terminal is handed over to the cell on the frequency F1.

In this embodiment, handover of the first terminal from the capacity layer to the coverage layer not only resolves a co-channel interference problem of the first terminal and improves the transmission rate and signal quality of the first terminal, but also balances load of the capacity layer and coverage layer. In this way, the load of the capacity layer and the load of the coverage layer are relatively balanced, and frequency resources of the coverage layer and capacity layer are fully utilized, thereby increasing the average transmission rate of the terminal in the current network.

In another embodiment of the coordinated scheduling method provided in the present disclosure, when the first terminal is located in an overlapping area having co-channel interference of two cells at the capacity layer, if the cell corresponding to the target carrier set is located at the capacity layer, that the first terminal is scheduled to the target carrier set, so that the first terminal is located in a target cell corresponding to the target carrier set includes:

the first terminal is scheduled from the capacity layer to the target cell corresponding to the target carrier set at the capacity layer.

Accordingly, in this embodiment, both the current cell of the first terminal and the target cell are located at the capacity layer, and the first terminal is handed over between different cells at the capacity layer. In the foregoing embodiment, in a process of scheduling the first terminal to the target carrier set, the first terminal is handed over from the capacity layer to the coverage layer.

A specific scenario is used below for description. The first terminal is located in the overlapping area having co-channel interference. Both the signal quality and transmission rate of the first terminal are reduced due to the co-channel interference.

In this case, assuming that the load of the capacity layer is not large, the target cell corresponding to the target carrier set may be another cell that does not have co-channel interference at the capacity layer. If the target cell is another cell at the capacity layer, the base station hands over the first terminal from the current cell at the capacity layer to the target cell at the capacity layer, so that the co-channel interference of the first terminal can be reduced, the transmission rate of the first terminal can be increased, and frequency resources of the coverage layer are not occupied, to ensure the transmission rate of the terminal at the coverage layer.

In the foregoing two embodiments, the current cell of the first terminal is located at the capacity layer, and the first terminal is located in the overlapping area having co-channel interference. It may be understood that the current cell of the first terminal may alternatively be a cell that does not have co-channel interference at the capacity layer. In this case, a process of scheduling the first terminal to the target carrier set is similar to the scheduling process in the foregoing embodiments.

The foregoing describes scheduling processes of the first terminal when the current cell of the first terminal is located at the capacity layer. The following describes the scheduling process when the current cell of the first terminal is located at the coverage layer.

In another embodiment of the coordinated scheduling method provided in the present disclosure, when the first terminal is located in a cell at the coverage layer, if the cell corresponding to the target carrier set is located at the capacity layer, that the first terminal is scheduled to the target carrier set, so that the first terminal is located in a target cell corresponding to the target carrier set includes:

the first terminal is scheduled from the cell at the coverage layer to the target cell corresponding to the target carrier set at the capacity layer.

It may be understood that although co-channel interference of cells at the coverage layer is small, due to limited frequency resource usage, especially when the coverage layer is heavily loaded, the transmission rate of the first terminal is affected.

Therefore, when the target cell is located at the capacity layer, the base station hands over the first terminal from the coverage layer to the capacity layer, to increase the transmission rate of the first terminal by using abundant frequency resources of the capacity layer, and reduce a limitation degree of usage of frequency resources of the coverage layer. Therefore, the average transmission rate of the terminal in the current network can be increased.

Figure 6:
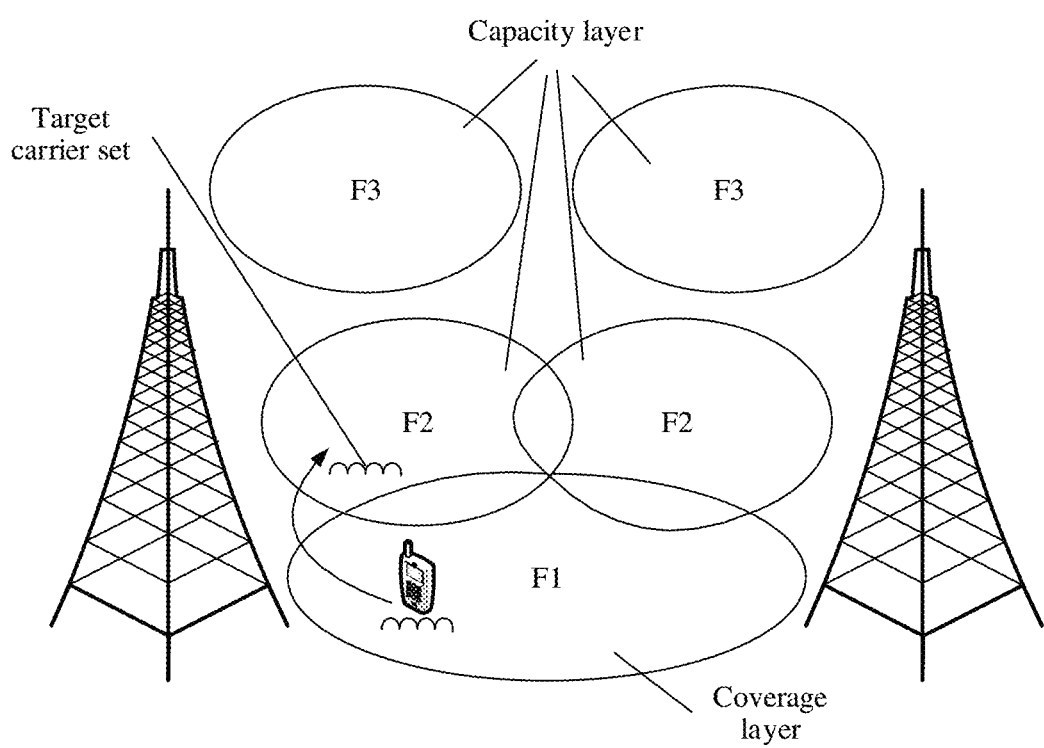
FIG. 6 is a schematic diagram of another embodiment of scheduling on a target carrier set according to an embodiment of this application.

FIG. 6 is a schematic diagram of another embodiment of scheduling on the target carrier set according to an embodiment of this application.

It can be learned from FIG. 6 that the current cell of the first terminal is located on a frequency F1, and the target carrier set is located in a set on a frequency F2. In the process of scheduling the first terminal to the target carrier set, the first terminal needs to be handed over from the current cell on the frequency F1 to the target cell on the frequency F2, and the first terminal is handed over from the coverage layer to the capacity layer.

It should be noted that the target cell corresponding to the target carrier set shown in FIG. 6 is a cell of a left base station on the frequency F2. Actually, the target cell may alternatively be a cell of a right base station on the frequency F2, or may be two cells on a frequency F3.

In another embodiment of the coordinated scheduling method provided in the present disclosure, when the first terminal is located in a cell at the coverage layer, if the cell corresponding to the target carrier set is located at the coverage layer, that the first terminal is scheduled to the target carrier set, so that the first terminal is located in a target cell corresponding to the target carrier set includes:

the first terminal is scheduled from the cell at the coverage layer to the target cell corresponding to the target carrier set at the coverage layer.

In this embodiment, the current cell of the first terminal is located at the coverage layer. However, the load of the current cell may be very large, affecting the signal quality and transmission rate of the first terminal. In this case, when the load of the coverage layer is relatively small, its frequency resources are relatively abundant, and the load of the capacity layer is relatively large, and its frequency resources are insufficient, a target cell that is finally determined may be another cell at the coverage layer. When the target cell is another cell at the coverage layer, the base station hands over the first terminal from the current cell at the coverage layer to the target cell at the coverage layer. Through the handover of the first terminal inside the coverage layer, the transmission rate of the first terminal is increased, the load of the coverage layer and capacity layer is balanced, and the frequency resources of the coverage layer are fully utilized.

The foregoing four embodiments specifically describe the processes of scheduling the first terminal to the target carrier set when the first terminal is the accessed terminal.

Figure 7:
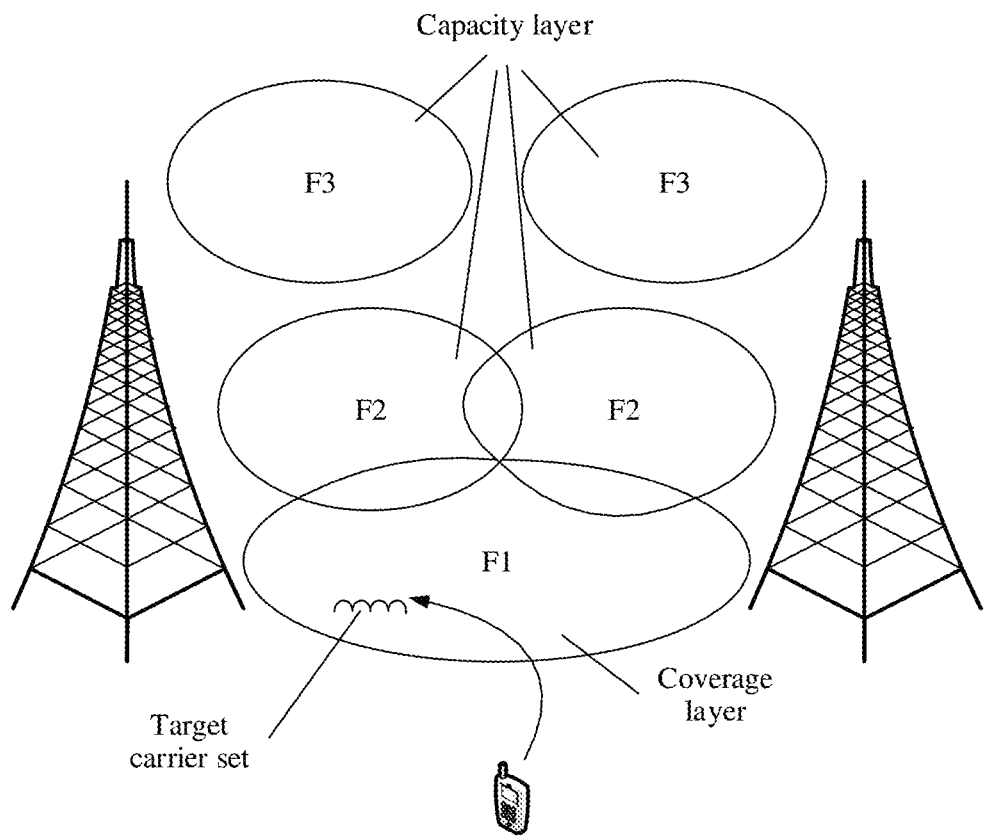
FIG. 7 is a schematic diagram of still another embodiment of scheduling on a target carrier set according to an embodiment of this application.

The following specifically describes a process of scheduling the first terminal to the target carrier set when the first terminal is the to-be-accessed terminal. FIG. 7 is a schematic diagram of still another embodiment of scheduling on the target carrier set according to an embodiment of this application.

It can be learned from FIG. 7 that the target cell corresponding to the target carrier set is a cell on a frequency F1 at the coverage layer. Therefore, a first mobile terminal is directly connected to the cell on the frequency F1 at the coverage layer.

It may be understood that when the target cell corresponding to the target carrier set is a cell at the capacity layer, the first terminal is directly connected to the cell at the capacity layer.

It can be learned from the foregoing analysis that there are a plurality of manners of determining the target carrier set based on the network information, and one of the manners is specifically described below.

In another embodiment of the coordinated scheduling method provided in the present disclosure, the determining of the target carrier set of the first terminal based on the network information includes:

determining a transmission rate set of the first terminal based on the network information, where the transmission rate set includes a transmission rate of the first terminal on each carrier set; and determining the target carrier set of the first terminal based on the transmission rate set.

It may be understood that in this embodiment, the transmission rate of the first terminal on each target carrier set is estimated based on the network information, and the target carrier set of the first terminal is then determined based on an estimation result.

There are a plurality of methods for determining the transmission rate based on the network information, and the methods are related to a type and a quantity of pieces of network information. Therefore, this is not limited in embodiments of this application.

The first terminal may be the accessed terminal, or may be the to-be-accessed terminal. Therefore, a process of determining the target carrier set in the two cases is separately described in detail in this embodiment.

In another embodiment of the coordinated scheduling method provided in the present disclosure, when the first terminal is the accessed terminal, the determining of the target carrier set of the first terminal based on the transmission rate set includes:

when at least one transmission rate in the transmission rate set is greater than a current transmission rate of the first terminal, determining a carrier set corresponding to a largest transmission rate in the transmission rate set as the target carrier set of the first terminal; and when no transmission rate in the transmission rate set is greater than the current transmission rate of the first terminal, determining a carrier set corresponding to the current transmission rate as the target carrier set of the first terminal.

It may be understood that when the at least one transmission rate in the transmission rate set is greater than the current transmission rate of the first terminal, it indicates that the current transmission rate of the first terminal may further be increased. To increase the transmission rate of the first terminal to a largest value, in this embodiment, a carrier set corresponding to a largest transmission rate is used as the target carrier set.

It should be noted that, in addition to the foregoing method for determining the target carrier set, a carrier set corresponding to any transmission rate larger than the current transmission rate in the carrier set may be further used as the target carrier set.

When no transmission rate in the transmission rate set is greater than the current transmission rate of the first terminal, it indicates that the current transmission rate of the first terminal is the largest value. Therefore, the current carrier set of the first terminal is used as the target carrier set.

In another embodiment of the coordinated scheduling method provided in the present disclosure, when the first terminal is a newly accessed terminal, the determining of the target carrier set of the first terminal based on the transmission rate set includes:
determining a carrier set corresponding to a largest transmission rate in the transmission rate set as the target carrier set of the first terminal.

It may be understood that when the first terminal is the newly accessed terminal, a current transmission rate is zero. Therefore, an estimated transmission rate does not need to be compared with the current transmission rate, and the carrier set corresponding to the largest transmission rate is the target carrier set.

It should be noted that, in addition to the foregoing method for determining the target carrier set of the first terminal, the target carrier set of the first terminal may also be determined in another manner. For example, in the transmission rate set, any carrier set is selected from carrier sets corresponding to top three transmission rates as the target carrier set.

In this embodiment, a process of obtaining the network information and determining the target carrier set based on the network information may be periodic. In one periodicity, there may be two or more first terminals that need to be scheduled. Therefore, all the first terminals need to be scheduled according to a specific priority.

For example, the scheduling of the first terminal to the target carrier set may include:
scheduling one of the two or more first terminals to the target carrier set, where a ratio of a transmission rate of the scheduled first terminal to the current transmission rate is the largest among all of the two or more first terminals.

In this embodiment, a first terminal having a larger transmission rate gain ratio is preferentially scheduled. For example, it is assumed that there are two first terminals, and current transmission rates of the two first terminals are both 10 Kbps/s. The transmission rate of one first terminal is 1 Mbps/s on the target carrier set, and the transmission rate of the other first terminal is 500 Kbps/s on the target carrier set. According to the scheduling method in this embodiment, it is clear that a ratio of 1 Mbps/s to 10 Kbps/s is greater than a ratio of 500 Kbps/s to 10 Kbps/s. Therefore, in this embodiment, the first terminal whose transmission rate is 1 Mbps/s on the target carrier set is preferentially scheduled.

In addition, all the first terminals may alternatively be scheduled according to another priority.

For example, a first terminal with a largest transmission rate on the target carrier set may be preferentially scheduled. Specifically, it is still assumed that there are two first terminals, a current transmission rate of one first terminal is 100 Kbps/s and the transmission rate is 1 Mbps/s on the target carrier set, and a current transmission rate of the other first terminal is 10 Kbps/s and the transmission rate is 500 Kbps/s on the target carrier set. It is clear that a ratio of 1 Mbps/s to 100 Kbps/s is less than a ratio of 500 Kbps/s to 10 Kbps/s. However, according to the scheduling method in this embodiment, the first terminal whose transmission rate is 1 Mbit/s on the target carrier set is preferentially adjusted.

Figure 8:
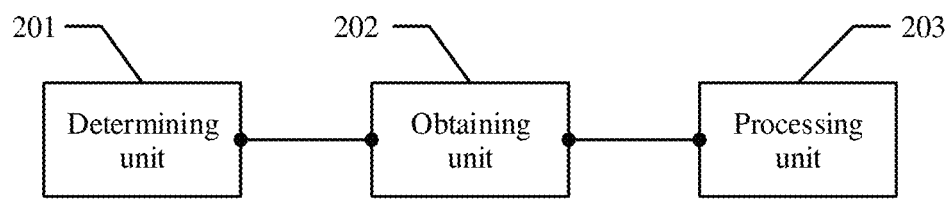
FIG. 8 is a schematic diagram of an embodiment of a coordinated scheduling apparatus according to an embodiment of this application.

FIG. 8 is a schematic diagram of an embodiment of a coordinated scheduling apparatus according to an embodiment of this application.

An embodiment of this application provides a coordinated scheduling apparatus, including:
a determining unit 201, configured to determine one or more frequencies corresponding to cells at a capacity layer and one or more frequencies corresponding to cells at a coverage layer;
an obtaining unit 202, configured to obtain network information of a first terminal on at least one carrier set, where the carrier set includes at least one carrier, and each carrier set corresponds to one cell; and
a processing unit 203, configured to optimize a current network based on the network information, where
the coverage layer includes a cell obtained by combining at least two cells having co-channel interference, and all the cells at the capacity layer are cells that are not combined.

In another embodiment of the coordinated scheduling method provided in the present disclosure, the processing unit 203 is further configured to:
determine the target carrier set of the first terminal based on the network information; and
schedule the first terminal to the target carrier set, so that the first terminal is located in a target cell corresponding to the target carrier set, where the target cell is a cell at the capacity layer or a cell at the coverage layer.

In another embodiment of the coordinated scheduling method provided in the present disclosure, when the first terminal is located in an overlapping area having co-channel interference of two cells at the capacity layer, if the cell corresponding to the target carrier set is located at the coverage layer, the processing unit 203 is further configured to:
determine the target carrier set of the first terminal based on the network information; and
schedule the first terminal from the overlapping area having co-channel interference at the capacity layer to the target cell corresponding to the target carrier set at the coverage layer.

In another embodiment of the coordinated scheduling method provided in the present disclosure, when the first terminal is located in a cell at the coverage layer, if the cell corresponding to the target carrier set is located at the capacity layer, the processing unit 203 is further configured to:
determine the target carrier set of the first terminal based on the network information; and
schedule the first terminal from the cell at the coverage layer to the target cell corresponding to the target carrier set at the capacity layer.

In another embodiment of the coordinated scheduling method provided in the present disclosure, when the first terminal is located in an overlapping area having co-channel interference of two cells at the capacity layer, if the cell corresponding to the target carrier set is located at the capacity layer, the processing unit 203 is further configured to:

determine the target carrier set of the first terminal based on the network information; and schedule the first terminal from the capacity layer to the target cell corresponding to the target carrier set at the capacity layer, so that the first terminal is handed over between different cells at the capacity layer.

In another embodiment of the coordinated scheduling method provided in the present disclosure, when the first terminal is located in a cell at the coverage layer, if the cell corresponding to the target carrier set is located at the coverage layer, the processing unit 203 is configured to:

determine the target carrier set of the first terminal based on the network information; and schedule the first terminal from the cell at the coverage layer to the target cell corresponding to the target carrier set at the coverage layer, so that the first terminal is handed over between different cells at the coverage layer.

In another embodiment of the coordinated scheduling method provided in the present disclosure, the processing unit 203 is further configured to:

determine a transmission rate set of the first terminal based on the network information, where the transmission rate set includes a transmission rate of the first terminal on each carrier set; and determine the target carrier set of the first terminal based on the transmission rate set.

In another embodiment of the coordinated scheduling method provided in the present disclosure, when the first is an accessed terminal, the determining of the target carrier set of the first terminal based on the network information includes:

when at least one transmission rate in the transmission rate set is greater than a current transmission rate of the first terminal, the base station determines a carrier set corresponding to a largest transmission rate in the transmission rate set as the target carrier set of the first terminal; and when no transmission rate in the transmission rate set is greater than the current transmission rate of the first terminal, the base station determines a carrier set corresponding to the current transmission rate as the target carrier set of the first terminal.

In another embodiment of the coordinated scheduling method provided in the present disclosure, when the first is a to-be-accessed terminal, the determining of the target carrier set of the first terminal based on the network information includes:

the base station determines a carrier set corresponding to a largest transmission rate in the transmission rate set as the target carrier set of the first terminal.

In another embodiment of the coordinated scheduling method provided in the present disclosure, when there are at least two first terminals, the scheduling of the first terminal to the target carrier set includes:

the base station schedules one of the at least two first terminals to the target carrier set, where a ratio of a transmission rate of the scheduled first terminal to the current transmission rate is the largest among all of the at least two first terminals.

In another embodiment of the coordinated scheduling method provided in the present disclosure, when there are at least two first terminals, the scheduling of the first terminal to the target carrier set includes:

the base station preferentially schedules a first terminal with a largest transmission rate on the target carrier set.

Figure 9:
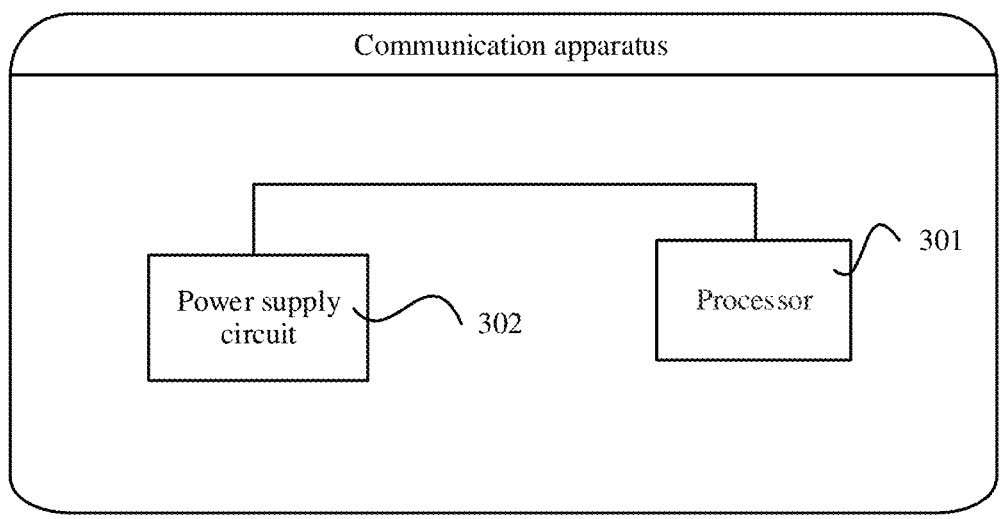
FIG. 9 is a schematic diagram of an embodiment of a communication apparatus according to an embodiment of this application.

FIG. 9 is a schematic diagram of an embodiment of a communication apparatus according to an embodiment of this application. An embodiment of this application further provides an embodiment of a communication apparatus, including at least one processor 301 and a power supply circuit 302. The power supply circuit 302 is configured to supply power to the processor 301, and related program instructions are executed by the at least one processor 301, to enable the communication apparatus to implement the method according to any one of the embodiments of this application.

In this embodiment, the processor 301 may perform an operation performed by the coordinated scheduling apparatus in the embodiment shown in FIG. 8.

In this embodiment, specific function module division in the processor 301 may be similar to function module division in the units such as the determining unit, the obtaining unit, and the processing unit described in FIG. 8.

The power supply circuit 302 in this embodiment includes but is not limited to at least one of the following: a power supply subsystem, an electrical tube management chip, a power consumption management processor, or a power consumption management control circuit.

An embodiment of this application provides a computer-readable storage medium, including instructions. When the instructions are run on a computer, the computer is enabled to perform the method according to any one of the embodiments of this application.

An embodiment of this application further provides a computer program product. The computer program product includes computer software instructions. The computer software instructions may be loaded by using a processor to implement a procedure of the coordinated scheduling method in FIG. 4.

A person skilled in the art may clearly understand that, for the purpose of convenient and brief description, for detailed working processes of the foregoing systems, apparatuses, and units, refer to corresponding processes in the foregoing method embodiments.

In the several embodiments provided in this application, it should be understood that the disclosed systems, apparatuses, and methods may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

What is claimed is:

1. A communication method, comprising:
   determining one or more frequencies corresponding to cells at a capacity layer and one or more frequencies corresponding to cells at a coverage layer;
   obtaining network information of a first terminal on at least one carrier set, wherein the at least one carrier set comprises at least one carrier, and each carrier set corresponds to one cell; and
   optimizing a current network based on the network information, wherein
   the coverage layer comprises a cell obtained by combining at least two cells having co-channel interference, and all the cells at the capacity layer are cells that are not combined,
   wherein the optimizing of the current network based on the network information comprises:
   determining a target carrier set of the first terminal based on the network information; and
   scheduling the first terminal to the target carrier set, so that the first terminal is located in a target cell corresponding to the target carrier set, wherein the target cell is at the capacity layer or at the coverage layer,
   wherein the determining of the target carrier set of the first terminal based on the network information comprises:
   determining a transmission rate set of the first terminal based on the network information, wherein the transmission rate set comprises a transmission rate of the first terminal on each of the at least one carrier set; and
   determining the target carrier set of the first terminal based on the transmission rate set.

2. The method according to claim 1, wherein upon determining that the first terminal is located in an overlapping area having co-channel interference of two cells at the capacity layer, and the cell corresponding to the target carrier set is located at the coverage layer, the scheduling of the first terminal to the target carrier set comprises:
   scheduling the first terminal from the overlapping area having co-channel interference at the capacity layer to the target cell corresponding to the target carrier set at the coverage layer.

3. The method according to claim 1, wherein upon determining that the first terminal is located in a cell at the coverage layer, and the cell corresponding to the target carrier set is located at the capacity layer, the scheduling of the first terminal to the target carrier set comprises:
   scheduling the first terminal from the cell at the coverage layer to the target cell corresponding to the target carrier set at the capacity layer.

4. The method according to claim 1, wherein upon determining that the first terminal is an accessed terminal,
   the determining of the target carrier set of the first terminal based on the transmission rate set comprises:
   upon determining that at least one transmission rate in the transmission rate set is greater than a current transmission rate of the first terminal, determining a carrier set corresponding to a largest transmission rate in the transmission rate set as the target carrier set of the first terminal; or
   upon determining that no transmission rate in the transmission rate set is greater than the current transmission rate of the first terminal, determining a carrier set corresponding to the current transmission rate as the target carrier set of the first terminal.

5. The method according to claim 1, wherein upon determining that the first terminal is a to-be-accessed terminal,
   the determining of the target carrier set of the first terminal based on the transmission rate set comprises:
   determining a carrier set corresponding to a largest transmission rate in the transmission rate set as the target carrier set of the first terminal.

6. The method according to claim 1, wherein upon determining that there are at least two first terminals, the scheduling of the first terminal to the target carrier set comprises:
   scheduling one of the at least two first terminals to the target carrier set, wherein a ratio of a transmission rate of the scheduled first terminal to a current transmission rate is the largest among all of the at least two first terminals.

7. A communication apparatus, comprising:
   at least one processor, and
   one or more memories coupled to the at least one processor and storing instructions that, when executed by the at least one processor, cause the communication apparatus to perform operations comprising:
   determining one or more frequencies corresponding to cells at a capacity layer and one or more frequencies corresponding to cells at a coverage layer;
   obtaining network information of a first terminal on at least one carrier set, wherein the at least one carrier set comprises at least one carrier, and each carrier set corresponds to one cell; and
   optimizing a current network based on the network information, wherein
   the coverage layer comprises a cell obtained by combining at least two cells having co-channel interference, and all the cells at the capacity layer are cells that are not combined,
   wherein the operations further comprise:
   determining a target carrier set of the first terminal based on the network information, and
   scheduling the first terminal to the target carrier set,
   wherein the operations further comprise:
   determining a transmission rate set of the first terminal based on the network information, wherein the transmission rate set comprises a transmission rate of the first terminal on each of the at least one carrier set; and
   determining the target carrier set of the first terminal based on the transmission rate set.

8. The communication apparatus according to claim 7, wherein the operations further comprise:
   upon determining that the first terminal is located in an overlapping area having co-channel interference of two cells at the capacity layer, and the cell corresponding to the target carrier set is located at the coverage layer, determining the target carrier set of the first terminal based on the network information, and scheduling the first terminal from the overlapping area having co-channel interference at the capacity layer to a target cell corresponding to the target carrier set at the coverage layer.

9. The communication apparatus according to claim 7, wherein the operations further comprise:

upon determining that the first terminal is located in a cell at the coverage layer, and the cell corresponding to the target carrier set is located at the capacity layer, determining the target carrier set of the first terminal based on the network information, and scheduling the first terminal from the cell at the coverage layer to a target cell corresponding to the target carrier set at the capacity layer.

10. The communication apparatus according to claim 7, wherein the operations further comprise:

upon determining that the first terminal is an accessed terminal, and at least one transmission rate in the transmission rate set is greater than a current transmission rate of the first terminal, determining a carrier set corresponding to a largest transmission rate in the transmission rate set as the target carrier set of the first terminal; or upon determining that no transmission rate in the transmission rate set is greater than the current transmission rate of the first terminal, determining a carrier set corresponding to the current transmission rate as the target carrier set of the first terminal.

11. The communication apparatus according to claim 7, wherein the operations further comprise:

upon determining that the first terminal is a to-be-accessed terminal, determining a carrier set corresponding to a largest transmission rate in the transmission rate set as the target carrier set of the first terminal.

12. The communication apparatus according to claim 7, wherein the operations further comprise:

upon determining that there are at least two first terminals, scheduling one of the at least two first terminals to the target carrier set, wherein a ratio of a transmission rate of the scheduled first terminal to a current transmission rate is the largest among all of the at least two first terminals.

13. A non-transitory computer-readable storage medium storing information comprising instructions that, when executed by at least one processor, control the at least one processor to perform operations comprising:

determining one or more frequencies corresponding to cells at a capacity layer and one or more frequencies corresponding to cells at a coverage layer;

obtaining network information of a first terminal on at least one carrier set, wherein each carrier set comprises at least one carrier and each carrier set corresponds to one cell; and optimizing a current network based on the network information, wherein the coverage layer comprises a cell obtained by combining at least two cells having co-channel interference, and all the cells at the capacity layer are cells that are not combined, wherein the optimizing of the current network based on the network information comprises:

determining a target carrier set of the first terminal based on the network information, and scheduling the first terminal to the target carrier set, so that the first terminal is located in a target cell corresponding to the target carrier set, wherein the target cell is at the capacity layer or at the coverage layer.

14. The non-transitory computer-readable storage medium according to claim 13, wherein upon determining that the first terminal is located in an overlapping area having co-channel interference of two cells at the capacity layer, and the cell corresponding to the target carrier set is located at the coverage layer, the scheduling of the first terminal to the target carrier set comprises:

scheduling the first terminal from the overlapping area having co-channel interference at the capacity layer to the target cell corresponding to the target carrier set at the coverage layer.

15. The non-transitory computer-readable storage medium according to claim 13, wherein upon determining that the first terminal is located in a cell at the coverage layer, and the cell corresponding to the target carrier set is located at the capacity layer, the scheduling of the first terminal to the target carrier set comprises:

scheduling the first terminal from the cell at the coverage layer to the target cell corresponding to the target carrier set at the capacity layer.

* * * * *